United States Patent [19]

Kerger

[11] Patent Number: 5,487,404
[45] Date of Patent: Jan. 30, 1996

[54] VALVE FOR A TAP OF A COMPRESSED OR LIQUIFIED GAS CYLINDER, AND TAP PROVIDED WITH SUCH A VALVE

[75] Inventor: Leon Kerger, Helmdange, Luxembourg

[73] Assignee: Torrent Trading Ltd., Toltola, Virgin Islands (Br.)

[21] Appl. No.: 273,920

[22] Filed: Jul. 12, 1994

[30] Foreign Application Priority Data

Jul. 12, 1993 [LU] Luxembourg .............................. 88379

[51] Int. Cl.$^6$ .......................... F16K 31/24; F16K 31/34; F16K 33/00
[52] U.S. Cl. .......................... 137/413; 137/442; 137/446; 137/614.2; 111/18; 111/95; 111/198; 111/213; 251/900
[58] Field of Search ..................................... 137/210, 413, 137/434, 442, 443, 444, 446, 614.2; 141/18, 95, 198, 206, 210, 213, 214, 216, 229; 251/900; 62/50.4, 50.7

[56] References Cited

U.S. PATENT DOCUMENTS

| | | | |
|---|---|---|---|
| 3,618,690 | 11/1971 | Johnson | 251/900 |
| 4,423,750 | 1/1984 | Morizumi et al. | 137/413 |
| 4,510,964 | 4/1985 | Wendling | 137/210 |
| 4,754,780 | 7/1988 | Smith, III | 251/900 |
| 5,282,496 | 2/1994 | Kerger | 141/18 |

FOREIGN PATENT DOCUMENTS 605477  6/1960  Italy ........................................ 137/446

*Primary Examiner*—George L. Walton
*Attorney, Agent, or Firm*—Leydig, Voit & Mayer, Ltd.

[57] ABSTRACT

The valve (30) comprises at least two lateral openings (34, 36) which can be shut off by a plug (40) provided with an axial orifice (48) for the passage of gas, which plug slides axially in the casing (32) between a position in which the openings (34, 36) are shut off under the influence of a spring (44) and an open position counter to the action of the spring (44) under the influence of the pressure of the filling gas, and a level valve (52) activated by a float (62) at the bottom of the casing (32).

In order to prevent pressure from building up inside the casing (32) after closure, the latter is provided with escape orifices (50) which are associated with resilient opening means (64).

6 Claims, 1 Drawing Sheet

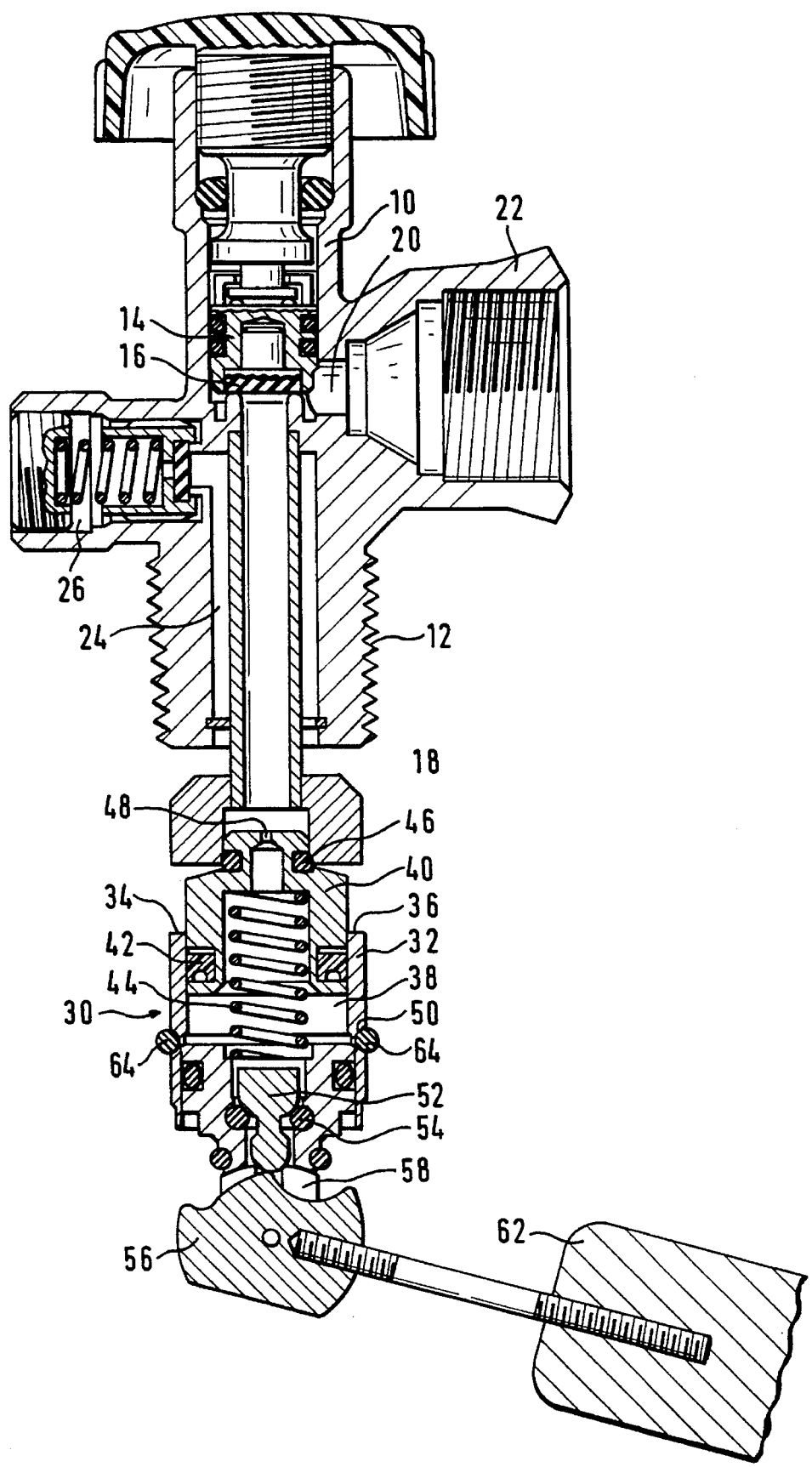

VALVE FOR A TAP OF A COMPRESSED OR LIQUIFIED GAS CYLINDER, AND TAP PROVIDED WITH SUCH A VALVE

The present invention relates to a valve for a tap of a compressed or liquefied gas cylinder, which valve is intended to be fitted on an inlet pipe of the tap, comprising a casing with at least one lateral opening which can be shut off by a plug provided with a passage for gas and which can be displaced, under the influence of resilient means, between a position in which the openings are shut off and an open position counter to the action of the said resilient means and under the influence of the pressure of the filling gas, and a level valve activated by a means for detecting the filling level, and at least one orifice establishing communication between the inside of the casing and the inlet pipe, on the one hand, and the inside of the cylinder, on the other hand. The invention also relates to a tap provided with such a valve.

A tap provided with such a valve is known and is described in greater detail in French Patent Application No. 9,116,025, which corresponds to U.S. Pat. No. 5,282,496. This tap is more particularly intended for gas cylinders which can be refilled by the user himself in a gas supply centre. To fill such a cylinder correctly in accordance with safety regulations, the cylinder must not be filled completely in order to preserve, above the liquefied gas, a gaseous zone which can act as a buffer, in the event of the cylinder being exposed to a heat source, and which can be released via a safety valve which must therefore obligatorily be situated in this gaseous zone. To this end, the tap described in the abovementioned patent application comprises a two-way valve which enables the cylinder to be filled and emptied and which is combined with a level valve, which whilst the cylinder is being filled, automatically closes the two-way valve when the gas level in the cylinder reaches a predetermined threshold.

During the filling operation, by closing the tap after the level valve has been closed by the action of the float, a certain quantity of liquid gas remains trapped inside the valve and the inlet pipe of the tap. Now, seeing that this trapped gas is in the liquid phase and is situated beyond the field of action of the safety valve, there is a danger of an explosion in the event of overheating. In order to avoid such a danger, an orifice has been provided in the wall of the casing of the valve which allows the liquid gas to flow into the cylinder after the tap has been closed, and thus enables the safety valve to perform its functions as far as the inside of the chamber and of the inlet pipe. The cross-section of this orifice must be less than the cross-section of the passage in the plug in order to make it possible to build up a sufficient pressure, after the level valve has been closed, in the chamber to cause the plug to slide into the position closing the lateral openings. Despite this orifice being small, it nevertheless has a negative influence on the speed of closure of the valve when the filling threshold is reached in that it delays the pressurization of the chamber within the casing.

Furthermore, a sensible user could continue the filling process even after the level valve has been closed, given that communication remains between the inlet pipe and the inside of the cylinder via this orifice. Admittedly, such an excessive filling would be very slow because of the limited throughput through the small cross-section of the orifice, however, seeing that the possibility exists, it is not out of the question for a cylinder to be filled beyond the safety threshold tolerated by the level detector and its closure valve.

The object of the present invention is to provide a valve of the abovementioned type which closes more quickly when the filling threshold is reached and which excludes all possibility of continuing the filling of the cylinder after the valve has closed.

To achieve this aim, the invention provides a valve of the type described in the pre-characterizing clause, which is characterized in that the said orifice is associated with resilient means resisting the maximum filling pressure in order to ensure the leaktight closure of the orifice and which yield at a pressure greater than the filling pressure in order to free the orifice.

According to the most simple embodiment, the said resilient means consist of an O-ring made from resilient rubber arranged in a groove around the casing of the valve, into which groove the orifice or orifices opens or open.

The invention also provides a tap which is provided with a valve as defined above.

According to a variant embodiment of the tap provided by the invention, the orifice and the said resilient means are not situated in the wall of the casing of the valve but in the wall of the inlet duct.

In any case, given that the said resilient means resist the filling pressure, they no longer permit the continuation of the filling through the orifices in question once the level valve is closed. They do, however, continue to fulfil their safety functions given that they yield under the action of an excessive pressure greater than the filling pressure to enable the gases contained in the valve and the inlet pipe to flow into the cylinder.

Other features of the invention will become apparent from an advantageous embodiment presented below by way of example, with reference to the single FIGURE which diagrammatically illustrates a vertical section through a tap and a two-way valve according to the present invention.

The structure and operation of the known tap will now be summarized briefly with reference to the FIGURE. The reader should refer to French Patent Application No. 9,116,025 and to corresponding U.S. Pat. No. 5,282,496 for further details.

The tap illustrated in this FIGURE comprises a metal body 10, for example made from brass, the lower part of which is provided with a thread 12 allowing the tap to be screwed onto a gas cylinder. The tap comprises a closure member 14 with a seal 16 at the intersection of an axial inlet duct 18 communicating with the inside of the cylinder, and a radial outlet duct 20 communicating with a connecting socket 22 which can be connected to a use circuit. The closure member 14 is activated manually using a lever or an operating wheel.

A passage 24 which establishes communication between the inside of the cylinder and a safety valve 26 is situated around the inlet duct 18. This valve allows gases to escape in the event of an abnormal excess pressure of the gas inside the cylinder. To this end, the passage 24 must obligatorily be in the gaseous zone, i.e. the cylinder cannot be filled up to the body 10 of the tap.

The inlet duct 18 is connected, inside the cylinder, to a two-way valve 30 which enables the gas cylinder to be both filled and emptied. This valve 30 comprises a casing 32 with two lateral openings 34 and 36. Inside this casing 32 is situated a cylindrical chamber 38 containing a plug 40 in the form of a piston which can slide axially and the sealing contact of which with the casing 32 is ensured by an O-ring 42. This piston 40 is subject to the action of a spring 44 which tends to maintain the piston 40 in the position in the FIGURE, in which its head is held, via a seal 46, leaktightly against the edge of the casing 32 in order to isolate the two lateral openings 34, 36 of the inlet duct 18. The chamber 38 communicates with the inlet duct 18 via an axial passage 48 through the piston 40.

The lower part of the valve 30 consists of the actual level valve 52. This valve 52 can slide axially between an open position freeing an annular passage for the gases between the casing 32 and the periphery of the valve 52 and a closed position in which the valve 52 is held leaktightly via a seal 54 against the lower part of the casing 32, forming the seat for this valve 52.

The valve 52 comprises a rounded foot which interacts with a cam 56 mounted pivotably in a clevis joint 58 of the casing 32. This cam 56 has a profiled contour designed so as to cause the valve 52 to move axially by its foot sliding along this profiled contour. The cam 56 is caused to pivot by a float 62 as the level of the liquified gas in the cylinder rises and falls.

When the cylinder is empty, the float 62 is in a lower position, whilst the level valve 52 is in a raised and open position under the influence of the cam 56. The connecting socket 22 is connected to a gas source with a view to filling the cylinder, and the closure member 14 is opened by the operating wheel. The gas enters under pressure through the inlet pipe 18 and, as a result of its pressure, depresses the piston 40 counter to the action of the spring 44 as far as the bottom of the chamber 38, thus freeing the two lateral openings 34 and 36 for the gas to pass into the cylinder.

The gas also enters through the passage 48 of the piston 40 and flows around the valve 52, in the open position, into the cylinder. A build-up of pressure in the chamber 38 must be prevented, as pressurization of said chamber 38 would be liable to cause the piston 40 to rise up and close the two lateral openings 34 and 36. To this end, the cross-section of the annular passage for gas flow around the valve 52 must be greater than the cross-section of the passage 48 in order to prevent the gas in the chamber 38 from being compressed.

When the float 62 pivots, as a result of the cylinder being filled, in an anticlockwise direction beyond the angular position in the FIGURE, the cam 56 releases the valve 52 to fall onto the seal 54 under the pressure of the filling gas. As soon as the valve 52 is closed, the increase in the pressure inside the chamber 38, combined with the action of the spring 44, causes the piston 40 to rise up and close the passage for the gas through the openings 34 and 36 and thus terminate the filling process.

In order to use the gas contained in the cylinder, you simply need to open the tap using its operating wheel. When the cylinder is completely full and the level valve 52 is closed, the flow of the gas from the chamber 38 and from the inlet pipe 18 lowers the pressure in this chamber 38 and allows the pressure of the gas in the cylinder to lift the level valve 52 into an open position. The gas can then flow around the valve 52 and escape through the passage 48 of the piston 40. Once the level of the liquid gas in the cylinder has fallen as far as the position of the float 62 in the FIGURE, the valve 52 is held open by the circular cross-section of the profiled contour of the cam 56 and there is nothing to prevent the flow of gas through the valve 30 each time the tap is opened.

The feature of this tap is consequently that it stops the filling operation automatically without requiring the attention or intervention of the user, and does so by means of a two-way valve enabling the cylinder to be emptied via the level valve and in accordance with the safety regulations which dictate that the entire gaseous zone must be situated within the field of action of the safety valve.

In order to prevent liquid gases from being trapped in the duct 18 and in the chamber 38 after the level valve has been closed, which gases would be situated beyond the zone of action of the safety valve 26, one or more safety orifices 50 have been provided in the wall of the casing 32 establishing communication between the inside of the cylinder and the inside of the chamber 38 and of the duct 18.

However, in order to avoid the disadvantages and risks of such orifices, as described in the introduction, the present invention proposes to associate the orifice 50 with means which keep it closed until the maximum filling pressure is reached.

In their most simple embodiment, these means consist of an O-ring 64 made from resilient rubber which is housed in a groove around the casing 32, into which groove the orifice 50 opens. Assuming that the maximum filling pressure when the level valve closes is $12 \times 10^5$ Pa, the seal 64 is, for example, designed to resist a pressure of $16 \times 10^5$ Pa. The filling pressure is therefore not able to cause the seal 64 to yield, opening the orifice or orifices 50, with the result that it is impossible for filling to take place through said orifices after the level valve 52 has closed.

However, if, for example following heating Up, the pressure in the chamber 38 and in the duct 18 exceeds the threshold $16 \times 10^5$ Pa, the resilient seal frees the orifice 50 and releases the excess pressure into the cylinder.

Given that the orifice 50 remains closed during the filling phase, the pressurization of the chamber 38 when the valve 52 closes takes place more quickly, so the response of the valve 30 to the action of the float is also quicker.

Instead of providing a resilient seal 64, it is also possible to associate the orifice 50 with a small valve subject to the action of a calibrated spring of the safety valve type like the valve 26.

Moreover, the safety orifice or orifices 50 and their resilient closure means do not necessarily have to be situated in the wall of the casing. Positioning them in the wall of the inlet pipe 18 provides the same results.

Correct operation of the known valve required a cross-section of the orifice 50 which was less than that of the axial passage 48. This condition no longer exists in the valve proposed by the present invention, given that the orifice 50 is always closed during normal operation.

Lastly, it should be noted that the invention is not limited to a valve of the two-way type as described above by way of example with reference to the FIGURE. It can just as easily be applied to a valve which is only used to fill the cylinder, i.e. gas is extracted using a different tap.

I claim:

1. Two-way valve for a tap of a gas cylinder, which valve is intended to be fitted on a selectively operable inlet pipe (18) of the tap, said two-way valve (30) permitting both filling and draining of the gas cylinder and comprising a casing (32) with at least one lateral opening (34, 36) which can be sealed off by a sealing device (40) provided with a passage (48) for gas, resiliently yieldable means (44) for displacing the sealing device (40) to a position of obstruction of the openings (34, 36) and for permitting the sealing device (40) to move to a position of opening against the action of the resiliently yieldable means (44) through the effect of the pressure of the filling gas, a level-controlling valve (52) movable between open and closed positions and operable, when in said open position, to permit gas to flow between the gas cylinder and the passage (48), and means (62) for detecting the filling level in the gas cylinder and for actuating the level-controlling valve (52) in response to such level, said level-controlling valve, when not held in an open position by said detecting means (62), being operable by the pressure of the gas in the cylinder when the pipe (18) is open, characterized by at least one orifice (50) disposed in at least one of a wall portion of the inlet pipe (18) and a wall portion of the casing (32) for establishing communication between the inside of the casing (32) and the inlet pipe (18), on the one hand, and the inside of the cylinder, on the other hand, said orifice (50) being associated with resilient vent means (64) which resist the maximum filling pressure in order to ensure the leak tight closure of the orifice (50) and which yield at a pressure greater than the maximum filling pressure in order to open the orifice (50) to prevent pressure from building up within either one of the inlet pipe (18) and the casing (32).

2. Valve according to claim 1, characterized in that the said resilient means consist of an O-ring (64) made from resilient rubber arranged in a groove around the casing (32) of the valve, into which groove the orifice (50) opens.

3. Tap for gas and comprising a tap body (10) designed to be fitted on a gas cylinder and enclosing a closure member (14) at the intersection of an inlet pipe (18) and of an outlet pipe (20), means for manoeuvering the closure member (14), a safety valve (26), the inlet pipe (18) communicating, on the side opposite the closure member (14), with a two-way valve (30) permitting both filling and draining of the gas cylinder, said valve (30) comprising a casing (32) with at least one lateral opening (34, 36) which can be sealed off by a sealing device (40) provided with a passage (48) for gas, resiliently yieldable means (44) for displacing the sealing device (40) to a position of obstruction of the openings (34, 36) and for permitting the sealing device (40) to move to a position of opening against the action of the resiliently yieldable means (44) through the effect of the pressure of the filling gas, a level-controlling valve (52) movable between open and closed positions and operable, when in said open position, to permit gas to flow between the gas cylinder and the passage (48), means (62) for detecting the filling level in the gas cylinder and for actuating the level-controlling valve (52) in response to such level, said level-controlling valve (52), when not held in an open position by said detecting means (62), being operable by the pressure of the gas in the cylinder when the closure member (14) is open, characterized by at least one orifice (50) disposed in at least one of a wall portion of the inlet pipe (18) and a wall portion of the casing (32) for establishing communication between the inside of the casing (32) and the inlet pipe (18), on the one hand, and the inside of the cylinder, on the other hand, said orifice (50) being associated with resilient vent means (64) which resist the maximum filling pressure in order to ensure the leak tight closure of the orifice (50) and which yield at a pressure greater than the filling pressure in order to open the orifice (50) to prevent pressure from building up within either one of the inlet pipe (18) and the casing (32).

4. Tap according to claim 3, characterized in that the said resilient means consist of an O-ring (64) made from resilient rubber which is arranged in a circular groove into which the orifice or orifices (50) opens.

5. Tap according to claim 3 characterized in that the said orifice (50) and resilient means are provided in the wall of the casing (32) of the valve.

6. Tap according to claim 4, characterized in that the said orifice (50) and resilient means are provided in the wall of the casing (32) of the valve.

* * * * *